UNITED STATES PATENT OFFICE.

HEINRICH BRUNCK, OF LUDWIGSHAFEN, BAVARIA, ASSIGNOR TO BADISCHE ANILIN AND SODA FABRIK, OF MANNHEIM, GERMANY.

MANUFACTURE OF ANTHRACENE-BLUE.

SPECIFICATION forming part of Letters Patent No. 274,081, dated March 13, 1883.

Application filed February 3, 1883. (No specimens.)

*To all whom it may concern:*

Be it known that I, HEINRICH BRUNCK, a citizen of the German Empire, residing at Ludwigshafen, in the Kingdom of Bavaria and Empire of Germany, have invented new and useful Improvements in the Manufacture of Anthracene-Blue, of which the following is a specification.

This invention relates to an improved process for manufacturing the blue coloring-matter described in my Patent No. 258,530, dated May 23, 1882, and called "anthracene-blue," the coloring-matter referred to being obtained by treating alizarine-blue with a solution of an alkaline bisulphite. The alizarine-blue to which I refer is the compound which can be produced from nitro-alizarine by treating the same with glycerine and sulphuric acid, as fully described in Letters Patent No. 258,530. According to the process described in the said patent, alizarine-blue is transformed into the coloring-matter called "anthracene-blue," as follows: A quantity of alizarine-blue representing about twelve pounds of dry crystal is added to about twenty-five or thirty pounds of a solution of bisulphite of soda of 1.25 specific gravity, and the mixture is left untouched in closed vessels for about eight to fourteen days, during which time a portion of the alizarine-blue is dissolved; and from the solution thus obtained the anthracene-blue is separated either by precipitation or by a careful evaporation.

The object of my present improvement is to shorten the time for effecting the solution of the alizarine-blue, and I have found that by employing a suitable solvent, in addition to the solutions of the bisulphite of soda, or any other alkali, alkaline earth, or a metal, the solution of the alizarine blue is facilitated. The solvents which I use for this purpose are alcohol, acetic acid, or acetic ether, and the bisulphites which can be used in lieu of those of the alkalies are those of Ca, Mg, Zn, Mn, Ae, Cr, Fe, and their double salts, with bisulphites of alkalies.

In carrying out my invention I take a quantity of alizarine-blue representing about twelve pounds of dry crystals, and add the same to about twenty-five or thirty pounds of a solution of the bisulphite of soda, or any other alkali or an alkaline earth, or of one of the metals above named. To this mixture I add from ten to fifteen per cent, in weight, of alcohol, acetic acid, or acetic ether, and I then allow the mixture to stand in closed vessels until the anthracene-blue has formed.

The anthracene-blue is obtained from the above solution by precipitating with common salt, or by careful evaporation, as usually practiced. The colors of the aqueous solutions vary from yellowish red to reddish brown, and their characteristics are substantially the same as those of the anthracene-blue described in my Letters Patent No. 258,530.

What I claim as new, and desire to secure by Letters Patent, is—

The within-described improvement in the process for the manufacture of anthracene-blue, which consists in exposing alizarine-blue to the action of the solution of bisulphite of soda or any other alkali, an alkaline earth, or a metal—such as zinc, chromium, or iron—in the presence of a suitable solvent, such as alcohol, acetic acid, or acetic ether.

In testimony whereof I have hereunto set my hand in the presence of two subscribing witnesses.

HEINRICH BRUNCK.

Witnesses:
AUGUST HANSER,
CARL HOFFMANN.